(12) United States Patent
Tao et al.

(10) Patent No.: US 7,674,498 B2
(45) Date of Patent: Mar. 9, 2010

(54) POROUS CERAMIC FILTERS WITH CATALYST COATINGS

(75) Inventors: Tinghong Tao, Big Flats, NY (US); Jianguo Wang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 888 days.

(21) Appl. No.: 11/498,640

(22) Filed: Aug. 3, 2006

(65) Prior Publication Data

US 2006/0270816 A1   Nov. 30, 2006

Related U.S. Application Data

(62) Division of application No. 10/788,946, filed on Feb. 27, 2004, now Pat. No. 7,122,612.

(51) Int. Cl.
*B05D 3/00* (2006.01)
(52) U.S. Cl. .............. 427/388.2; 427/384; 427/314; 427/226; 526/317.1; 526/307.5; 526/303.1
(58) Field of Classification Search .......... 427/388.2, 427/384, 314, 226; 526/317.1, 307.5, 303.1
See application file for complete search history.

(56) References Cited

U.S. PATENT DOCUMENTS

| | | | | |
|---|---|---|---|---|
| 3,784,649 | A | 1/1974 | Buckman et al. | 525/153 |
| 4,143,181 | A | 3/1979 | Cahn et al. | 427/195 |
| 4,451,517 | A | 5/1984 | Inoguchi et al. | |
| 4,483,940 | A | 11/1984 | Ono et al. | 502/159 |
| 4,532,228 | A * | 7/1985 | Golino et al. | 502/261 |
| 4,765,867 | A | 8/1988 | Dreisbach et al. | 162/72 |
| 5,346,722 | A | 9/1994 | Beauseigneur et al. | |
| 5,460,854 | A * | 10/1995 | Krug | 427/393.6 |
| 5,866,016 | A | 2/1999 | Jaquess et al. | |
| 6,541,407 | B2 | 4/2003 | Beall et al. | |
| 2002/0011439 | A1 | 1/2002 | Blum et al. | 210/490 |
| 2006/0141154 | A1 | 6/2006 | Thebault | 427/249.2 |

FOREIGN PATENT DOCUMENTS

| | | |
|---|---|---|
| DE | 2 732 062 | 2/1978 |
| EP | 0 149 912 | 7/1986 |
| FR | 2 850 649 | 8/2004 |
| GB | 2 263 658 | 8/1993 |
| JP | 02-284636 | * 11/1990 |
| JP | 03-072928 | * 3/1991 |
| WO | 2004/069769 | 8/2004 |

OTHER PUBLICATIONS

Chemical Abstracts:CAN 137:314553, Hwang, Y.-S.; Choi, S.-C., "The preparation for sintered body of CeO2 based complex oxide in low temperature solid oxide fuel cells using colloidal surface chemistry", Ceramic Materials and Components for Engines, [International Symposium], 7th, Goslar, Germany, Jun. 19-21, 2000 2001, 605-610.
Chemical Abstracts:CAN 137:282912, Palk, U.; Park, H.-C.; Choi, S.-C.; Ha, C.-G.; Kim, J.-W.; Jung, Y.-G., "Effect of particle dispersion on microstructure and strength of reaction-bonded silicon carbide", *Materials Science & Engineering*, A: Structural Materials: Properties, Microstructure and Processing 2002, A334, 267-274.
Chemical Abstracts:CAN 134:20502, Moon, J.; Grau, J. E.; Cima, M. J.; Sachs, E. M., "Slurry chemistry control to produce easily redispersible ceramic powder compacts", *Journal of the American Ceramic Society*, 83 (2000), pp. 2401-2408.
Chemical Abstracts:CAN 131:246918, Bryden, R. H.; Caley, W. F., "Lime-alumina-silica vitreous ceramic processing incorporating wollastonite", *British Ceramic Transactions*, 98 (1999), pp. 127-132.
Chemical Abstracts:CAN 131:232394, Bendeich, P. J.; Walls, P. A., "Aqueous milling and near net shape forming of SiAION ceramics", *International Ceramic Monographs*, 2 (1996), pp. 1717-1722.
Chemical Abstracts:CAN 129:334445, Bryden, R. H.; Caley, W. F., "Wet processing alumina-wollastonite suspensions using a cationic polyelectrolyte" *Journal of Materials Science Letters*, 17(1998), pp. 895-897.
Chemical Abstracts:CAN 127:338554, Sakurai, H.; Date, M.. "Nonacidic plating baths for Sn or Sn-Pb alloy platings and plating method using the same"; Dipsol Chemicals Co., Ltd., Japan 1997.
Chemical Abstracts:CAN 122:323159, Pradip; Premachanran, R. S.; Malghan, S. G., "Electrokinetic behavior and dispersion characteristics of ceramic powders with cationic and anionic polyelectrolytes" *Bulletin of Materials Science*, 17(1994), pp. 911-920.

* cited by examiner

*Primary Examiner*—Ling-Siu Choi
(74) *Attorney, Agent, or Firm*—Matthew B. McNutt

(57) ABSTRACT

Porous ceramic catalyst supports or filters to be provided with catalyst coatings via oxide washcoating processes are precoated with cross-linked polymer barrier layers to prevent washcoat nanoparticle intrusion into the microcracked and/or microporous surfaces of the ceramics, the barrier coatings being formed by thermally cross-linking hydrocarbon polymers that are vaporizable at moderate washcoat stabilization or catalyst activation temperatures and that preferentially block the micropore/microchannel pore volume of the article.

6 Claims, 2 Drawing Sheets

POROUS CERAMIC FILTERS WITH CATALYST COATINGS

This is a divisional of U.S. patent application Ser. No. 10/788,946 filed on Feb. 27, 2004, now U.S. Pat. No. 7,122,612 the content of which is relied upon and incorporated herein by reference in its entirety, and the benefit of priority under 35 U.S.C. §120 is hereby claimed.

BACKGROUND OF THE INVENTION

The present invention relates to processes for applying catalyst or catalyst support coatings onto ceramic supports. More particularly, the invention relates to methods for coating ceramic substrates with catalyst coatings wherein a pre-coating or passivation step is used to improve the properties of the catalyzed substrates, by reducing catalyst and/or support coating diffusion into the fine pores, microchannels (necks interconnecting individual pores), and microcrack structure of the substrates.

To address tightening diesel engine emissions regulations being adopted in the United States and Europe, recent attention has focused on basic improvements in the design and performance of ceramic wall-flow honeycomb filters for treating diesel exhaust gases. Among other improvements, design changes allowing for the use of catalyst coatings to control hydrocarbon and/or nitrogen oxide emissions are being implemented. The goal is to develop an improved high-temperature-resistant, high-thermal-shock-resistant, low cost honeycomb soot filter compatible with advanced emissions control catalyst technologies that can replace current high-cost and/or uncatalyzed particulate filters.

Among the filter designs being developed for this application are refractory ceramic oxide filters offering improved resistance to high exhaust temperatures encountered during decarbonizing filter regeneration cycles, as well as to the thermal shock conditions arising during rapid filter heat-up and cool-down in the course of startup and regeneration. Examples of advanced cordierite and aluminum titanate compositions and honeycomb filter designs being developed for these applications are disclosed in U.S. Pat. No. 6,541,407 and in co-pending, commonly assigned U.S. patent application Ser. No. 60/400,248 filed Jul. 31, 2002, U.S. Ser. No. 10/209,684 filed Jul. 31, 2002, and U.S. Ser. No. 10/098,711 filed Mar. 14, 2002. Among other materials that are candidates for refractory, catalyst-compatible ceramic particulate filters are the refractory alkali zirconium phosphates as well as low-expansion alkali aluminosilicates such as beta-eucryptite and pollucite. Many of these same compositions, and other microcracked ceramic materials such as the calcium aluminates, are being considered for use as flow-through catalyst supports for the control of nitrogen oxide (NOx) emissions from automotive and diesel engines These ceramic materials meet or exceed most specifications for high melting point, high thermal capacity, and low thermal expansion required for diesel exhaust filter applications. However, one difficulty encountered with porous ceramics intended to function as particulate filters is the tendency to decrease in gas permeability and increase in thermal expansion as catalysts and catalyst support washcoatings are applied to the filter walls. For good thermal shock resistance, the increases in CTE resulting from the application of washcoats and catalysts should not exceed $10 \times 10^{-7}/°$ C. averaged over the range from 25-1000° C., and CTE values for the washcoated filters should not exceed $20 \times 10^{-7}/°$ C. over that temperature range. Further, gas permeabilities through the catalyzed filter should be sufficient to maintain pressure drops below 8 kPa at exhaust gas space velocities up to $150,000 \, hr^{-1}$ after filter regeneration to remove trapped particulates.

Present understanding is that, during the washcoating or catalyzing process, both wall porosity of the filter and the structural micro-cracks (crack widths of 0.1-3 microns) that are present in most of these ceramic materials are frequently filled with the washcoating material. The problem is most severe in the case of highly microcracked ceramics such as the aluminum titanates, particularly when the washcoating formulations contain materials of very fine particle size (e.g., particle diameters in the 0.02-0.1 µm range).

Microcracking is a significant contributor to the low CTEs exhibited by many of these materials, with crack closure during heating considerably moderating the dimensional increases that would otherwise occur. Thus the filling of these microcracks with washcoating constituents can result in some cases in much higher expansion coefficients, e.g., in the range of $40\text{-}50 \times 10^{-7}/°$ C., in the washcoated structures. At these CTE levels the risk of structural damage to the filters under the normal conditions of exhaust filter use is unacceptable.

One approach to the problem of washcoat microcrack filling that has been employed during the catalyzation of conventional flow-through catalyst substrates for gasoline engine emissions control has been the use of so-called passivating coatings. These are pre-coatings applied to the walls of the ceramic substrates prior to washcoating that can block the washcoating materials from intruding into the microcrack structure of the ceramic. U.S. Pat. No. 4,532,228 provides some examples of coating materials that can be carbonized or otherwise solidified to provide a washcoat barrier.

Recent advances in materials and processes for the pre-washcoat passivation of microcracked ceramic wall flow filters and flow-through catalyst supports include those described in co-pending, commonly assigned U.S. patent application Ser. No. 10/641,638 of S. Ogunwumi et al., filed Aug. 14, 2003, expressly incorporated herein by reference in its entirety. That application discloses pre-coating such ceramics with polymer barrier or passivation layers to prevent washcoat nanoparticle intrusion into the microcracked and/or microporous surfaces of the ceramics. The barrier coatings employed are formed of hydrocarbon polymers that are soluble or dispersible in polar media, capable of forming neutral or hydrophilic surfaces on porous ceramic supports, and completely vaporizable at moderate washcoat stabilization or catalyst activation temperatures.

The polymer barrier coatings disclosed in that application moderate CTE increases and limit the reductions in exhaust gas permeability necessarily arising from the application of washcoating layers to microporous ceramic filters, although in some cases surface interactions between the hydrophobic polymer coatings and the hydrophilic washcoat are observed. Thus while backpressure increases from washcoat layering and pore blockage are difficult to avoid entirely, the described coatings offer improvements in thermal expansion and gas permeability characteristics that enable a wide variety of ceramic filter materials to meet existing commercial requirements.

Nevertheless, although progress in development of catalytic filters has been substantial, thermal expansion and pressure drop and/or porosity remain key performance characteristics, not only of catalytic filters but also of conventional flow-through ceramic catalyst supports as well. Thus improved materials and methods for simultaneously preserving the low thermal expansion coefficients and high gas permeabilities of advanced ceramic support or filter materials, even at high catalyst washcoat loadings, remain important objectives of current development programs.

SUMMARY OF THE INVENTION

The present invention provides improved passivating methods offering particular advantages for the passivation of high porosity microcracked ceramic honeycomb filters to be provided with washcoats and catalyst coatings. The improved materials and processes of the invention more selectively protect or pre-fill microcracks, micropores, and microchannels during the washcoating process, thus more effectively protecting the gas permeability of the high porosity ceramic walls of the filters.

The effectiveness of the invention derives largely from the use of a thermally crosslinkable polymer formulation to pre-treat a porous ceramic support or filter structure to be subsequently provided with a catalyst coating. Thus, in one embodiment, the invention includes a method for protecting the microporous pore structure of a porous ceramic article which comprises, first, applying to the article to be catalyst-coated a polymer solution or dispersion comprising, in addition to a suitable vehicle such as water, a cross-link promoter and a thermally cross-linkable, and thermally pyrolyzable hydrocarbon polymer. The polymer solution will be sufficiently dilute and/or flowable to secure a liquid viscosity suitable for effectively penetrating the pore structure of the ceramic.

After the application of the aqueous polymer solution or dispersion the ceramic article is heated to temperatures sufficient to substantially remove the water or other vehicle and to achieve thermal cross-linking the hydrocarbon polymer. Desirably, polymer crosslinking will be initiated at temperatures near the vaporization temperature of the vehicle, so that full drying and extensive cross-linking of the polymer can be efficiently achieved at similar temperatures during a single heating cycle. However, separate drying and crosslinking stages or cycles can also be used. An important aspect of the drying/cross-linking process is that it appears to produce local concentrations of polymer solution that more selectively deposit polymer coating material within the fine pores, microchannels, and microcracks of the ceramic.

In a second aspect the invention provides an improved method for applying a catalyst or catalyst washcoat to a ceramic catalyst support such as a catalytic gas filter. In accordance with that method, the catalyst support is first provided with a protective thermally crosslinked polymer coating to provide a polymer-coated catalyst support in accordance with the above-described polymer coating method. Thereafter, a catalyst, or a catalyst washcoating suspension with or without a contained catalyst, is applied to the polymer-coated support, and the catalyst suspension or washcoating is dried to provide a catalyst-coated or washcoated support.

Finally, the washcoated or catalyst-coated support is heated to a temperature at least sufficient to remove the cross-linked polymer coating by pyrolysis or oxidation. The resulting catalyzed or washcoated catalyst support is particularly well adapted for use as a filter to remove particulate material from fluid streams such as combustion exhaust gases, because it exhibits a lower pressure drop after the application of the catalyst coating or washcoating than similarly coated supports provided in accordance with prior practice.

While the reasons for the effectiveness of the invention have not been fully confirmed, present understanding is that the heating associated with thermal cross-linking helps to enrich the polymer solution within the fine pores and fine connecting microchannels of the ceramic article. Micro-capillary effects may tend to increase the solution boiling point in the microchannels and micropores of the structure such that, at the end stage of the solution drying process and as the polymer starts to crosslink through thermal activation, it selectively occupies or blocks the fine pores and fine openings of interconnecting microchannels within the ceramic. The resulting micropore/microchannel blockage guides catalyst and/or washcoat solutions into the coarser pore structure of the ceramic.

Subsequent thermal processing to remove the cross-linked polymer then clears the polymer-blocked fine pore and channel structure of the ceramic to restore gas flow, largely re-establishing the gas permeability of the original porous filter wall. Further, since the majority of the wall pore volume resides in the coarse pore structure of the ceramic, high catalyst loadings in combination with low washcoated pressure drops are realized.

An important advantage of the method of the invention as above described is that the selective nature of the polymer coating decreases the amount of polymer needed for microcrack protection or fine pore blockage. This reduces process cost, and also significantly reduces secondary emissions from the catalyzing process, both important considerations for catalyst coating manufacturers.

In yet a further aspect the invention includes a porous ceramic article having a pore structure characterized by the presence of a coarse pore volume and a micropore/microchannel pore volume and wherein the pore structure containing a cross-linked polymer barrier coating that preferentially blocks the micropore/microchannel pore volume of the article. By preferentially blocking the micropore/microchannel pore volume we mean that the micropore/microchannel pore volume of the article is reduced relative to the coarse pore volume of the article by the presence of the barrier coating. Among the preferred porous ceramics provided with polymer barrier coatings in accordance with the invention are porous ceramic filter bodies composed principally of an aluminum titanate or cordierite ceramic material.

BRIEF DESCRIPTION OF THE DRAWINGS

The invention is further described below with reference to the drawings, wherein.

DETAILED DESCRIPTION

The preferred cross-linkable polymers for use in the invention are the water-soluble polymeric ionenes, including the amine-functional water-soluble ionenes. When properly cross-linked, these polymers provide particularly durable and appropriately targeted barriers against microparticulate intrusion into ceramic micropores and microchannels, yet retain surfaces of neutral or hydrophilic character in the presence of typical aqueous washcoating or catalyst preparations so that they do not interfere with the efficiency of catalyst or washcoat deposition from those solutions. Moreover, the cross-linked barrier coatings that form from these polymers can be entirely removed from the interconnecting microchannel structure of ceramic materials by thermal decomposition at only modest temperatures, without residues and without disruption of the overlying washcoat.

A representative example of a thermally cross-linkable hydrocarbon polymer of the ionene type is the polymer present in commercial water-treating polymer preparations such as PC-1195™ solution, commercially sold by GE Betz, GE Water Technologies, Trevose, Pa., U.S.A. This polymer has a molecular weight of approximately 170,000 and is comprised of a regular quaterammonium group backbone with 2 mole percent functional amine groups on molecular side chains.

A typical reaction path for the thermal crosslinking of this polymer in the present of the crosslinking agent epichlorohydrin is as follows:

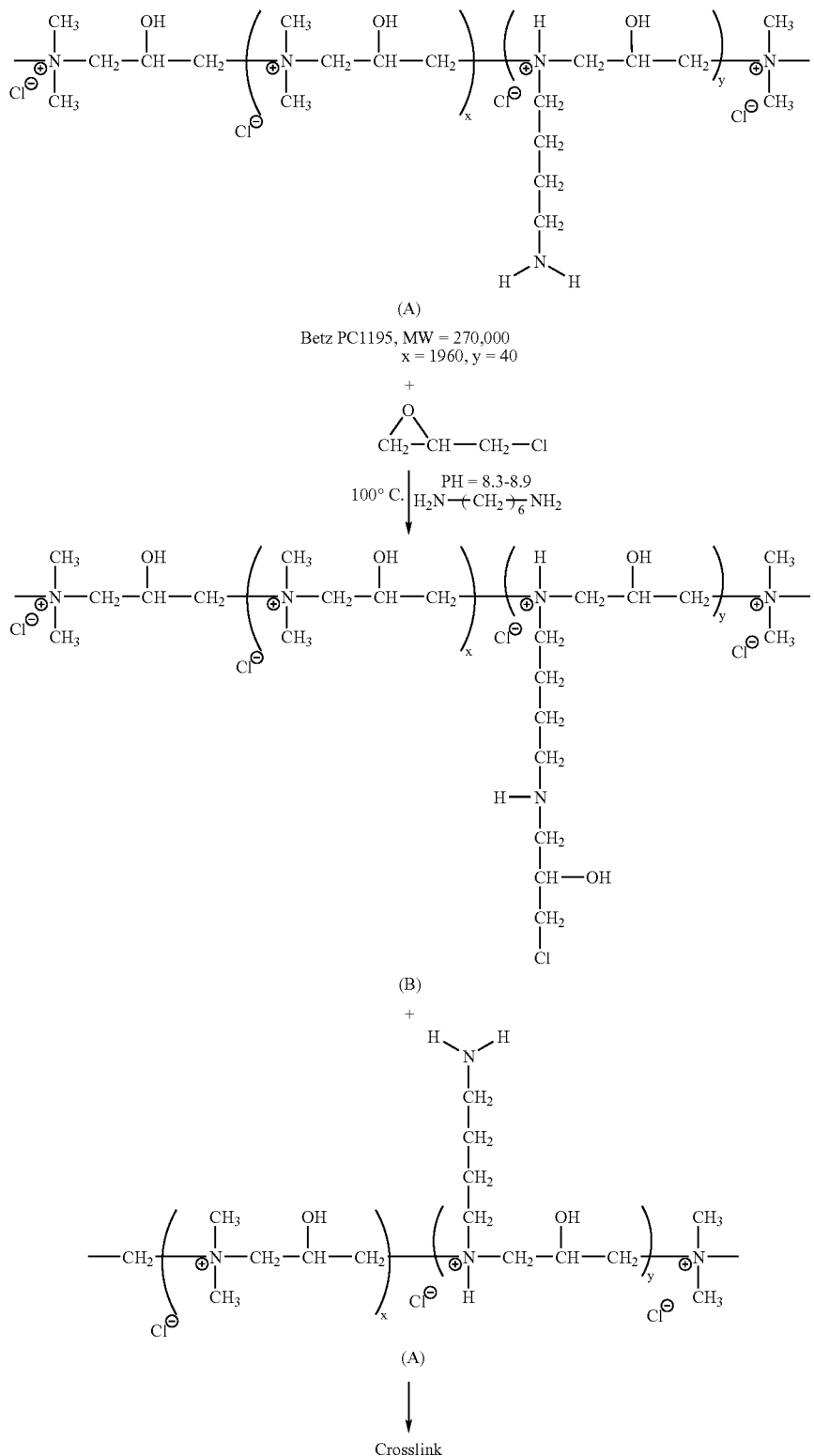

For the particular polymer illustrated above, the value of x is typically 1960 and the value of y is typically about 40. In a cross-linking process of the type shown, the amino groups on functional side chains (A) will first react with the epoxy groups of the cross-linking agent to form addition products (B). The chloride sites on the addition products then react via the Menschutkin reaction with functional amino groups on unreacted polymer side chains to form crosslinked product.

The Menschutkin reaction is a slow reaction at low polymer concentrations, and accordingly crosslinking that will progress to the point gelation point via these reactions normally occurs only at elevated temperatures and in relatively concentrated polymer solutions. Thus this reaction path provides an effective control mechanism for controlling the distribution and properties of cross-linked polymer coatings for a wide range of different porous ceramic materials.

Figure 1:
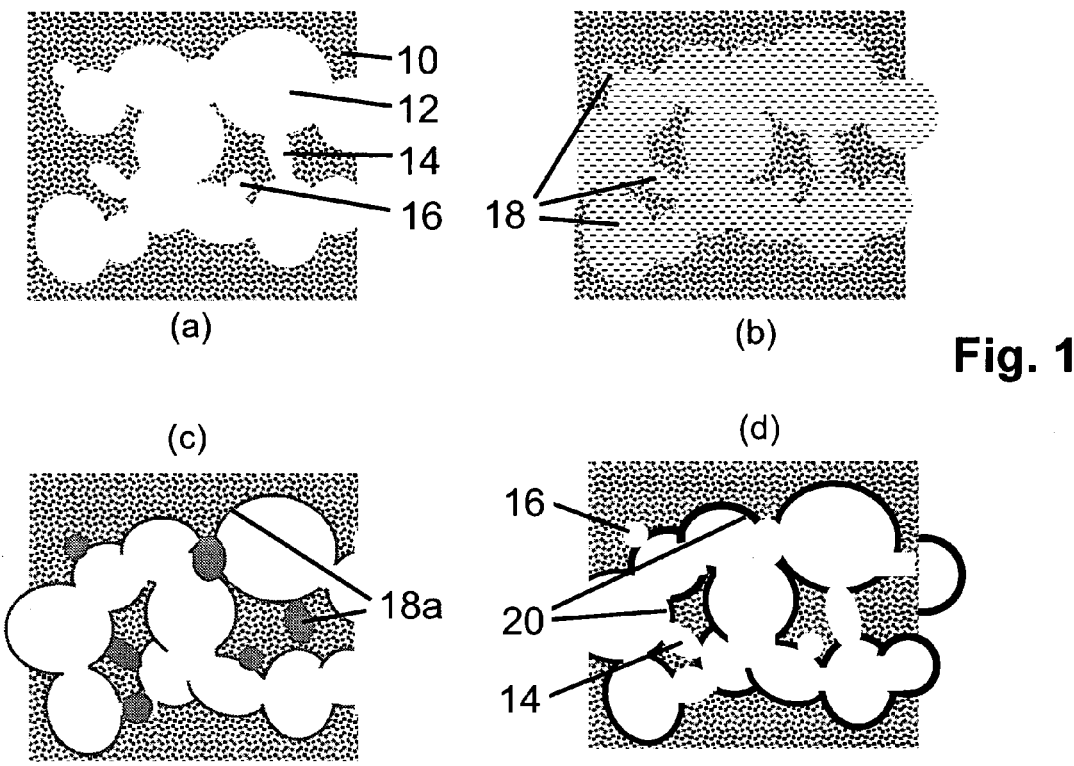
FIG. 1 is a schematic illustration of a process by which a cross-linkable polymer solution can support the selective application of a catalyst washcoating.

While not wishing to be bound by theory, the mechanism for selectively washcoating or catalyzing a porous ceramic article as it is presently understood is schematically illustrated in FIG. 1 of the drawing. Referring first to FIG. 1(a), a section 10 of a porous ceramic article selected for washcoating is characterized by a pore structure that includes both coarse pores 12 and also fine microchannels 14 and micropores 16 associated with and/or interconnecting the coarse porosity. The continuous, interconnected nature of this pore structure imparts high gas permeability to the ceramic.

Referring next to FIG. 1(b), in the course of providing a cross-linked polymer coating within the pore structure of such a ceramic article a polymer solution 18 is first caused to completely fill the pore structure of the article, most probably including the micropores 12 and microchannels 14 thereof. Subsequent heating of the ceramic to dry and crosslink polymer 18 produces a cross-linked polymer 18a as illustrated in FIG. 1(c) of the drawing. Noteworthy is the fact that the distribution of cross-linked polymer 18a, although in the form of relatively thin coatings on the walls of the coarse pores of the ceramic, appears also to include polymer concentrations in the micropores and microchannels of the ceramic that are of a size sufficient to largely fill and/or block those smaller openings.

While not conclusive, evidence for thermally cross-linked barrier coating distributions such as illustrated in FIG. 1(c) is provided by mercury porosimitry data indicating a preferential reduction in micropore/microchannel volume over coarse pore volume in barrier-coated porous ceramic samples. By micropores and microchannels, is meant those pores and channels within a porous ceramic material that have a least cross-sectional dimension not exceeding about 5 micrometers, the micropore/microchannel volume of the material then being that volume fraction of the total pore volume of the material made of such pores and channels.

Applying and fixing a catalyst or catalyst washcoat within the pore structure of the ceramic with removal of the cross-linked polymer barrier coating as shown in FIG. 1(c) results in a coating distribution such as illustrated in FIG. 1(d). That distribution is characterized by washcoatings or catalyst coatings of effective thickness on the pore surfaces of the coarse pores, but ceramic microchannels and micropores that are largely free of washcoating material. This selective distribution of catalysts and/or catalyst washcoats produces a catalyzed ceramic product having good gas permeability as well as good catalyst effectiveness.

The advantages of cross-linked polymer coatings over other polymer or organic coatings for porous ceramic materials are threefold. First, the cross-linking step renders the polymers less soluble and dispersible in water, tending to minimize or eliminate transport or removal of the polymer coating by subsequently applied aqueous washcoating suspensions. Secondly, cross-linking can significantly reduce the thickness of the polymer coatings and thus increase the proportion of the coarse pore volume of the ceramic material available for the deposition of catalysts and/or washcoats. Thirdly, the amount of polymer usage for effective blockage of microcracks, micropores, and microchannels is significantly reduced.

Any of a variety of different cross-linkable polymers may in principle be employed for depositing the described barrier coatings provided certain functional requirements are met. One requirement is that the polymer form stable solutions or suspensions of low viscosity that will not rapidly increase in viscosity, through cross-linking or otherwise, when first brought into contact with the active pore surfaces of porous ceramics. Secondly, the selected polymer must form a cross-linked polymer coating that is wetable and/or otherwise compatible with aqueous washcoating and/or catalyst coating solutions. And finally, the cross-linked coating formed by the polymer must be fully pyrolyzable, i.e., able to be vaporized without significant residue at moderate washcoat stabilization or catalyst activation temperatures.

Given these requirements, water-soluble amine-functional ionenes constitute the presently preferred polymers for these barrier coatings. However, other polymer systems, including polyvinylalcohol, polyacrylic acid, and polyacrylic amines that can be stably dispersed or dissolved in evaporable liquids to form low-viscosity solutions, and that are compatible with crosslinking agents that can initiate polymer cross-linking at or near the drying temperatures of the solutions, may alternatively be used.

Polymer solutions that are preferred for the production of low CTE, highly gas-permeable ceramic products are generally relatively dilute aqueous solutions of polymer, typically comprising about 1-20% of water-soluble polymer by weight of the solution. The amount of cross-linking agent employed will vary depending on the compositions of the selected polymer and cross-linking agent, but are readily determinable by routine experiment. Epichlorohydrin is one of the more effective cross-linking agents for amine-functional ionene polymers, being generally useful at solution pH values in the range of about 8-9 in concentrations in the range of about 1-20% by weight of the polymer present in the solution. However, other cross-linking agents, including the known dichloride and/or diamine polymer crosslinking agents, may alternatively or additionally be used. Water removal from such solutions as applied to porous ceramic substrates can conveniently be carried out by heating the ceramics to temperatures in the range of 100° C., at which temperatures cross-linking of the residual polymer also efficiently proceeds.

The invention is further described below with reference to the following examples, which are intended to be illustrative rather than limiting.

EXAMPLE 1

Cross-linkable polymer solutions are prepared following one of two procedures. In a first procedure, 4.0 g of 70% (weight) hexamethylenediamine solution and 7.5 g of 99% (weight) epichlorohydrin are mixed into 2500 ml samples of three ionene polymer solutions. The polymer solutions are solutions of 1.5% (weight), 3% (weight), and 6% (weight) polymer concentration, being made up in each case by an appropriate water dilution of a commercial ionene polymer preparation. The commercial preparation is PC-1195™ polymer solution, sold by GE Betz, GE Water Technologies, Trevose, Pa., U.S.A. and containing about 40-50% by weight of dissolved amine-functional ionene polymer solids having a molecular weight of about 170,000. The three cross-linkable polymer solutions thus provided are allowed to age for five days prior to use.

In a second procedure, a 3450 ml sample of a 12% (weight) PC-1195™ ionene solution is mixed with 30.0 g of a 70% (weight) hexamethylenediamine solution and 63.4 g of 99% (weight) epichlorohydrin at room temperature. The resulting solution is again aged for 5 days, and thereafter used either in original or water-diluted concentrations to provide appropriately concentrated polymer solutions for porous ceramic pretreatments.

To test the effectiveness of these polymer solutions for maintaining low thermal expansion and high gas permeability in ceramic catalyst supports, a number of ceramic honeycomb samples are selected for polymer-coating. The selected samples are cylindrical ceramic honeycomb filter samples approximately 5 cm diameter and 12 cm length, being composed of a porous strontium feldspar ($SrO.Al_2O_3.2SiO_2$) aluminum titanate ceramic and featuring alternately plugged channels running axially of the cylinder at a cell density of 200 square channels per square inch of honeycomb cross-section. The aluminum titanate ceramic material forming these filters has a fully consolidated density of about 3.5 g/cm$^3$ and a linear coefficient of thermal expansion (25-1000° C.) of 15-16×10$^{-7}$/° C. The porous walls of the honeycomb have a thickness of about 0.4 mm and a porosity of about 47-48% by volume.

For each solution to be tested, a honeycomb filter sample as above described is fully immersed in the solution under vacuum, removed, and then oven-dried and cross-linked by heating to a temperature of about 100° C. for about three hours.

Following the barrier coating of these honeycombs in accordance with the above described procedure, the coated samples are subjected to a conventional washcoating process utilizing a commercially available alumina-based washcoating solution. The washcoating solution employed is Nyacol® AL20 colloidal alumina sol, commercially available from Nyacol Nano Technologies, Inc., Ashland, Mass., U.S.A. The washcoating process comprises dip-coating the barrier coated filters in the washcoating solution for 2 minutes to achieve an even coating layer, and then removing excess coating from the sample using compressed air.

The thus-washcoated filter samples are next air-dried at ambient temperatures for 15 minutes and then oven-dried in a programmable oven at 100° C. for 3 hours. The dried washcoated filters are then further heated in the oven to a final hold temperature of 550° C. and held at that temperature for 3 hours to pyrolize the cross-linked polymer barrier material and set the alumina washcoats. Finally, the heat-treated samples are removed from the oven, weighed to determine the amount of washcoat deposited on each sample, and evaluated for thermal expansion changes and pressure drop performance.

Typical results obtained from the testing of these washcoated filter samples pretreated with the cross-linkable polymer barrier solutions as above described are reported in Table 1 below. Included in Table 1 for each of the tested samples are an initial sample weight, the concentration of the polymer barrier coating solution employed, the coating weight of the dried and cross-linked polymer coating as a percent of the coated sample weight, a washcoating weight for the washcoated sample in grams/liter of sample volume, a linear coefficient of thermal expansion (CTE) value for the washcoated sample, expressed as an average expansion per ° C. over the temperature range 25-1000° C., and fluid pressure drop data for the washcoated sample as determined in a flowing synthetic (air) exhaust gas stream.

The pressure drop data included in Table 1 are reported as pressure drop ratios, in each case being the ratio of the washcoated filter pressure drop to the initial (bare) filter pressure drop under a standard test condition. The standard test condition is to measure filter pressure drop at a gas flow rate of about 0.75 m$^3$/min through the filter after loading the filter with about 5 g/liter of a synthetic trapped carbon particulate.

TABLE 1

Barrier-Coated Aluminum Titanate Filters

| Sample No. | Bare Sample Weight (g) | Crosslinkable Polymer Solution Concentration | Cross-Linked Polymer Coating Weight (%) | Washcoat Weight (g/L) | CTE (×10$^{-7}$/° C.) | Pressure Drop Ratio |
|---|---|---|---|---|---|---|
| -06 | 179.94 | 1.5% wt | 0.43 | 53.8 | 42.4 | 1.44 |
| -08 | 181.11 | 3.0% wt | 0.89 | 54.5 | 36.2 | 1.34 |
| -12 | 182.84 | 6.0% wt | 1.74 | 53.3 | 28.1 | 1.55 |

As the data in Table 1 reflect, cross-linked polymer coating weight increases linearly with the concentration of pretreatment solution, with a rapid decrease in sample CTE accompanying the increase in coating weight. For this particular test series essentially the same washcoat loading (53-55 g/L) is present in all three cases, and in all three cases the increases in pressure drop for the washcoated filters, as reflected by the ratios of washcoated filter pressure drop to bare filter pressure drop, are at or below 55%. Typical pressure drop ratios observed for washcoated filters of this composition that are not provided with polymer barrier coatings are in the range of 1.6-2.0, depending directly on the weight of washcoating material applied.

EXAMPLE 2

Following the procedure of Example 1 above, several additional aluminum titanate ceramic samples similar in composition to the filter samples of Example 1, but having a lower average linear coefficient of thermal expansion (CTE) of about 4.7×10$^{-7}$/° C. over the 25-1000° C. temperature range, are polymer-coated and washcoated as described in that Example. The washcoated samples are then tested for the extent of CTE increase, with the results reported in Table 2 below.

TABLE 2

Barrier-Coated Aluminum Titanate Honeycomb Samples

| Sample No. | Bare Sample Weight (g) | Crosslinkable Polymer Solution Concentration | CrossLinked Polymer Coating Weight (%) | Washcoat Weight (g/L) | CTE (×10$^{-7}$/° C.) |
|---|---|---|---|---|---|
| 6-1 | 33.932 | 6.0% wt | 1.03 | 38.9 | 8.8 |
| 6-2 | 24.506 | 9.0% wt | 1.61 | 41.3 | 7.9 |
| 6-3 | 36.089 | 12.0% wt | 2.12 | 40.2 | 4.8 |

As the data reported in Table 2 suggest, ceramic honeycomb samples coated with cross-linkable ionene polymer solutions of increasing concentration show decreasing levels of thermal expansion change resulting from the washcoating process. In fact, with sufficiently concentrated barrier polymer coating solutions that can provide sufficiently high cross-linked polymer barrier coating weights, washcoated aluminum titanate ceramic honeycomb products with CTE values very close to those of bare filters can be provided.

The beneficial effects of cross-linked polymer barrier coatings are not limited to any particular family of ceramics, but instead can be obtained for a wide variety of different, gas-permeable ceramic catalyst supports. Thus similar improvements in washcoated filter permeability and CTE result when cross-linked polymer barrier coatings are applied to cordierite (magnesium aluminosilicate) ceramic filters, as illustrated below.

EXAMPLE 3

A number of ceramic coating samples are prepared from a cordierite ceramic honeycomb stock, the samples being alternately plugged at opposite ends to provide small honeycomb filter samples. The cordierite honeycombs have a cell density of about 31 cells/cm$^2$, a channel wall thickness of about 300 micrometers, and an average linear coefficient of thermal expansion (25-1000° C.) of about $8 \times 10^{-7}$/° C.

Each filter sample is coated with a selected cross-linkable ionene polymer coating from one of the ionene polymer solutions above described, and is then heated to remove water and cross-link the polymer as described in Example 1. The samples are then washcoated with the alumina suspension as described in Example 1, except that the commercial Nyacol® AL20 alumina washcoating suspension was first water-diluted to a pH of 3.5 prior to use. Finally the suspension-coated samples are heated to set the washcoat and pyrolize the polymer coating.

Table 3 below presents data resulting from the testing of cordierite samples produced as above described, along with data for two additional samples not provided with cross-linked polymer barrier coatings prior to washcoating. Included in Table 3 for each of the samples tested are an initial sample weight; the concentration of the polymer barrier coating solution employed to coat the sample, if any; the resulting cross-linked polymer coating weight as a percent of the sample weight; the weight of the applied washcoating for each washcoated sample, reported in grams/liter of sample volume; a linear coefficient of thermal expansion (CTE) value for the washcoated sample, expressed as an average expansion per ° C. over the temperature range 25-1000° C.; and pressure drop data for the washcoated sample. The pressure drop data are again reported as ratios of washcoated to bare filter pressure drop as in Example 1, under pressure drop testing conditions equivalent to those therein described.

TABLE 3

Barrier-Coated Cordierite Filters

| Sample No. | Bare Sample Weight (g) | Crosslinkable Polymer Solution Concentration | Cross-Linked Polymer Coating Weight (%) | Washcoat Weight (g/L) | CTE ($\times 10^{-7}$/° C.) | Pressure Drop Ratio |
|---|---|---|---|---|---|---|
| 1A | 131.90 | No treatment | 0 | 43.1 | 8.6 | 1.85 |
| 1C | 125.58 | No treatment | 0 | 28.4 | 7.4 | 1.49 |
| 22A | 152.18 | 1.5% wt | 0.44 | 41.9 | 7.4 | 1.41 |
| 22D | 153.02 | 1.5% wt | 0.50 | 28.1 | 6.4 | 1.20 |
| 25A | 155.42 | 3.0% wt | 1.09 | 36.5 | 5.3 | 1.31 |
| 25D | 151.88 | 3.0% wt | 1.25 | 25.7 | 5.9 | 1.18 |

As the data in Table 3 reflect, the polymer-pretreated cordierite filters show a significant decrease in thermal expansion coefficient when compared with filters not provided with polymer coatings prior to washcoating. CTE reductions on the order of 10-30% from the CTE values exhibited by unprotected filter are typical. Even more importantly, pressure drop ratios for the polymer-pretreated filters are reduced by as much as 40-65% over washcoated filters not pretreated to apply polymer barrier coatings, when similar washcoat loadings are present.

Again, the blocking of fine pores and channels by the polymer during the oven drying and cross-linking processes is thought to play an important role in controlling the final distribution of the washcoats in these cordierite ceramic materials. For cordierite filters in the porosity range of about 40% to 65%, it will generally be found that washcoated filter pressure drop increases from base or bare filter pressure drop levels can be reduced by about 50% using cross-linked polymer barrier coatings.

Figure 2:
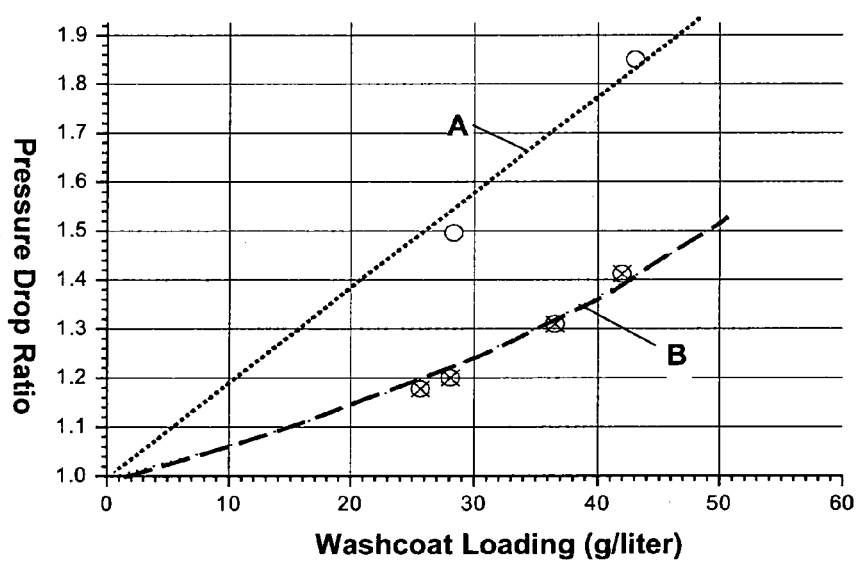
FIG. 2 plots pressure drop ratios for washcoated versus non-washcoated porous filters both with and without a cross-linkable polymer pre-treatment.

FIG. 2 of the drawing is a graph plotting pressure drop ratios as defined above against alumina washcoat loadings in grams per liter of filter volume for two series of cordierite filters. The first series, identified by data curve A in FIG. 2, includes washcoated filters prepared without the prior application of a cross-linked polymer barrier coating. The second series, identified by data curve B, includes similarly washcoated filters pre-treated to provide a cross-linked polymer barrier coating prior to washcoating. As these data again indicate, the pressure drop ratios for the barrier-coated filters (B) rise much less steeply with increasing washcoat loading than do the same ratios for the filters not protected by polymer barrier coatings. Advantageously, then, filter washcoat and/or catalyst loadings can be significantly increased in barrier-coated filters without exceeding the pressure drops offered by conventionally washcoated filters, or conventional washcoat/catalyst loadings can be provided that will operate at significantly lower filter pressure drop.

Figure 3:
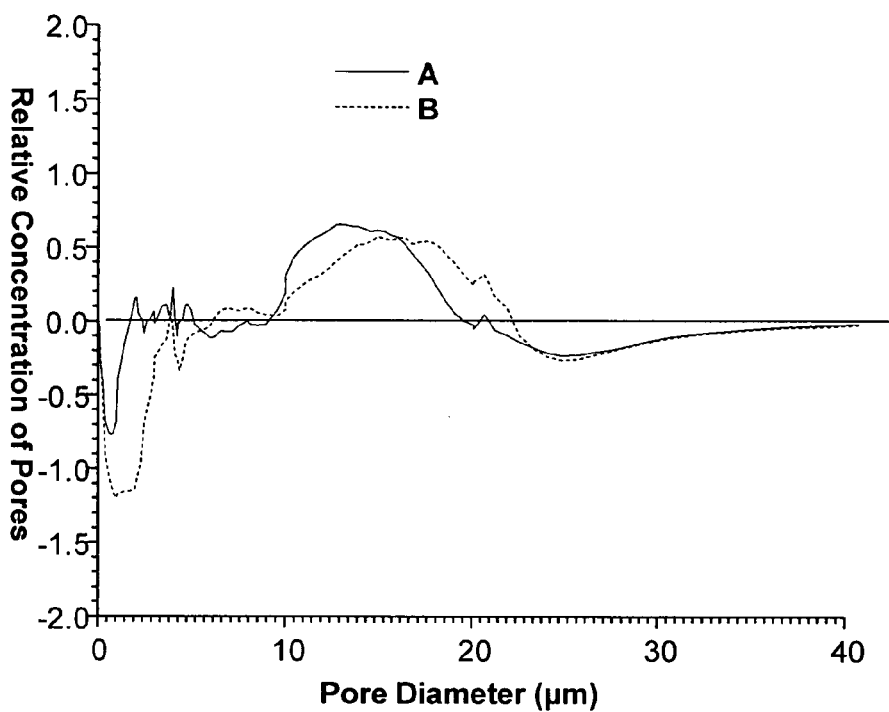
FIG. 3 plots the relative coarse pore and micropore/microchannel pore volumes of porous ceramics provided with cross-linked polymer barrier coatings in accordance with the invention.

FIG. 3 of the drawing plots relative pore concentrations as a function of pore size over a range of pore sizes in a porous ceramic material provided with two different cross-linked polymer barrier coatings such as above described. The coated ceramic samples evaluated include both micropores, defined for present purposes as having diameters in the range of about 5 micrometers and below, and coarse pores, defined for present purposes as having diameters from above 5 micrometers to about 40 micrometers.

Curve A plots the relative changes in pore concentration, from the zero base line representing no change in pore size distribution, caused by applying a cross-linked polymer pore coating to a first ceramic sample from a 3 weight percent ionene polymer solution, while Curve B plots the corresponding changes for a second ceramic sample resulting from the use of a 6 weight percent ionene polymer solution. Both curves suggest a preferential blocking of the micropore/microchannel pore volume of the ceramic by the applied barrier coatings, in that the pore concentrations in the micropore/microchannel size range are substantially decreased in comparison to the pore concentrations in the coarse pore size range. The more concentrated ionene polymer solution produces a greater preferential blocking effect.

Figure 4:
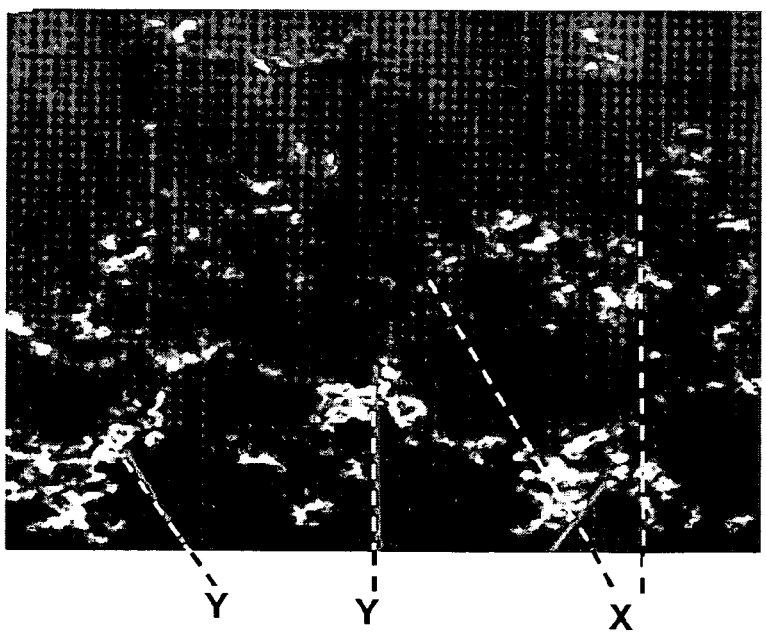
FIG. 4 is a microprobe scan of a cross-section of a polymer-coated filter indicating local concentrations of polymer present within the structure.

FIG. 4 of the drawing is a photomicrograph resulting from an electron microprobe analysis of a small cross-section of a polymer-coated ceramic honeycomb filter sample. The analysis of FIG. 4 probed for chlorine associated with cross-linked polymer concentrations within the pore structure of the ceramic, the latter structure being indicated by the dark gray, largely interconnecting network sections "X" disposed across entire dark field of the micrograph. The bright regions in the micrograph indicate concentrations of polymer within the micropore and microchannel regions "Y" of the pore structure, the polymer coating thus leaving the remaining coarser pore volume of the ceramic open for the deposition of washcoatings and catalysts while blocking washcoat deposition within structure blocked by the polymer concentrations.

Of course, the foregoing examples and descriptions are intended to be illustrative rather than limiting as to the invention as it may be practiced within the scope of the appended claims.

We claim:

1. A porous ceramic article having a pore structure characterized by the presence of a coarse pore volume and a micropore/microchannel pore volume, the pore structure supporting a cross-linked polymer barrier coating optionally disposed within the micropore/microchannel pore volume of the article.

2. A porous ceramic article in accordance with claim 1 which has a ceramic composition selected from the group consisting of aluminum titanate and cordierite ceramics.

3. A porous ceramic article in accordance with claim 2 wherein the coarse pore volume of the pore structure is open for the deposition of a washcoating.

4. A porous ceramic article having a pore structure characterized by the presence of a coarse pore volume and a micropore/microchannel pore volume, wherein the micropore/microchannel pore volume comprises pores and channels having a cross-sectional dimensions not exceeding 5 micrometers, the pore structure supporting a cross-linked polymer barrier coating disposed within micropore/microchannel pore volume of the article such that the pores and channels comprising the micropore/microchannel pore volume are substantially blocked.

5. A porous ceramic article in accordance with claim 4 wherein the coarse pore volume of the pore structure is open for the deposition of a washcoating.

6. A porous ceramic article having a pore structure characterized by a pore size distribution comprising a coarse pore concentration defined by pores having diameters between 5 micrometers and 40 micrometers and a micropore/microchannel pore concentration defined by pores and channels having diameters not exceeding 5 micrometers, wherein when the pore structure is coated with a cross-linked polymer barrier coating the micropore/microchannel pore concentration decreases more than the coarse pore concentration.

* * * * *